(12) United States Patent
Wang

(10) Patent No.: US 8,015,668 B2
(45) Date of Patent: Sep. 13, 2011

(54) HINGE ASSEMBLY

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 339 days.

(21) Appl. No.: 12/436,263

(22) Filed: May 6, 2009

(65) Prior Publication Data

US 2010/0064477 A1    Mar. 18, 2010

(30) Foreign Application Priority Data

Sep. 12, 2008 (CN) .......................... 2008 1 0304477

(51) Int. Cl.
*E05D 11/10* (2006.01)
(52) U.S. Cl. ................. 16/338; 16/330; 16/340; 16/303
(58) Field of Classification Search .......... 016/337–339, 016/342, 330, 303, 374, 376, 377, 340, 355, 016/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | |
|---|---|---|---|
| 4,186,905 A * | 2/1980 | Brudy | 248/478 |
| 7,870,644 B2 * | 1/2011 | Chang | 16/337 |
| 2005/0276412 A1 * | 12/2005 | Kfoury | 379/433.13 |
| 2007/0039134 A1 * | 2/2007 | Lu et al. | 16/330 |
| 2007/0169312 A1 * | 7/2007 | Ho et al. | 16/330 |
| 2007/0180656 A1 * | 8/2007 | Chen et al. | 16/340 |
| 2009/0158556 A1 * | 6/2009 | Chang et al. | 16/330 |
| 2009/0235489 A1 * | 9/2009 | Chang et al. | 16/340 |
| 2010/0000370 A1 * | 1/2010 | Chang | 74/567 |

* cited by examiner

*Primary Examiner* — Chuck Y. Mah
(74) *Attorney, Agent, or Firm* — Altis Law Group, Inc.

(57) ABSTRACT

A hinge assembly includes a pivotal shaft, a connecting member, a supporting member, a stationary member having an engaging surface, a rotating member having a receiving surface, and a locking member. A first end of the pivotal shaft is fixed to the connecting member. A second of the pivotal shaft is passed through the supporting member, the stationary member, the rotating member, and the locking member. The stationary member is fixed on the supporting member and is rotatable relative to the pivotal shaft. The rotating member is non-rotatable relative to the pivotal shaft. The engaging surface forms two first positioning protrusions and two second positioning protrusions. The receiving surface defines two first positioning grooves to receive the first positioning protrusions and two second positioning grooves to receive the second positioning protrusions. A height of each second positioning protrusion is larger than a height of each first positioning protrusion.

15 Claims, 3 Drawing Sheets

HINGE ASSEMBLY

CROSS-REFERENCE TO RELATED APPLICATIONS

This application is related to three co-pending U.S. patent applications, which are: application Ser. Nos. 12/261,225 and 12/261,230, and both entitled "HINGE ASSEMBLY", and application Ser. No. 12/417,817, and entitled "HINGE ASSEMBLY". The co-pending applications have the same assignee as the present application.

BACKGROUND

1. Technical Field

The present disclosure relates to a hinge assembly, and particularly to a hinge assembly employed in an electronic device.

2. Description of the Related Art

A typical hinge assembly includes a pivotal shaft, a supporting frame, a connecting frame, a stationary member, a rotating member, a plurality of elastic members, and a nut. The stationary member forms a positioning protrusion on a side surface of the stationary member. The rotating member defines a position depression to receive the positioning protrusion of the stationary member in a side surface of the rotating member.

The connecting frame, the limiting member, and the rotating member are non-rotatably sleeved on the pivotal shaft, and the supporting frame and the stationary member are rotatably sleeved on the pivotal shaft. The elastic members provide axial force driving the stationary member to engage with the rotating member. The nut prevents the stationary member, the rotating member, and the elastic members from detaching from the shaft.

In use, the connecting frame rotates relative to the supporting frame. Simultaneously, the pivotal shaft rotates together with the connecting frame and drives the limiting member and the rotating member to rotate. The positioning protrusion is able to slide into or out from the position depression, so that the connecting frame and the supporting frame can be maintained in a desired position.

However, the positioning protrusion and the position depression are easily abraded. Therefore, a usage life of the typical hinge assembly is shortened.

Therefore, a new hinge assembly is desired in order to overcome the above-described shortcomings.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
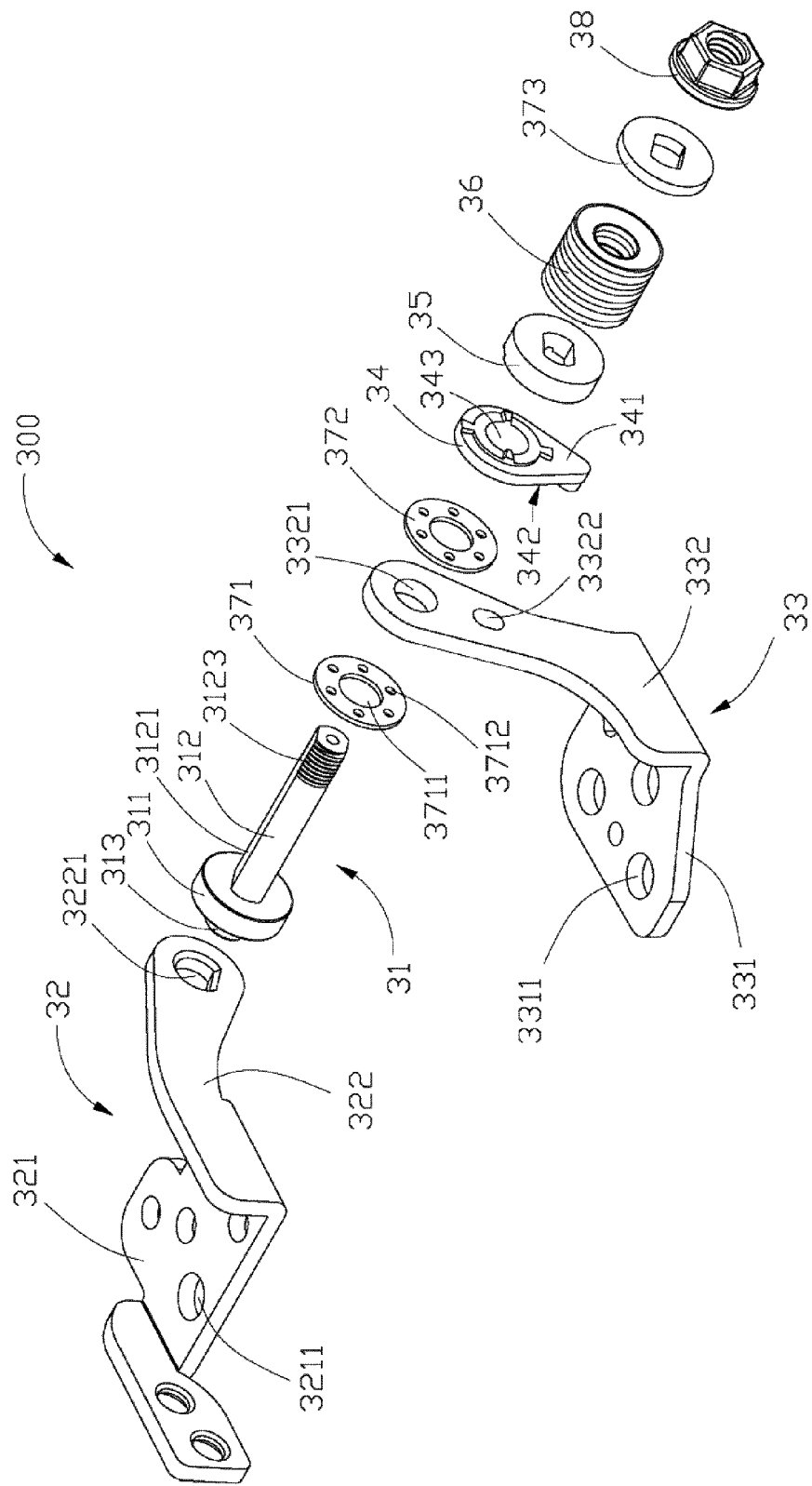
FIG. 1 is an exploded, isometric view of an embodiment of a hinge assembly, the hinge assembly including a stationary member and a rotating member.
Figure 2:
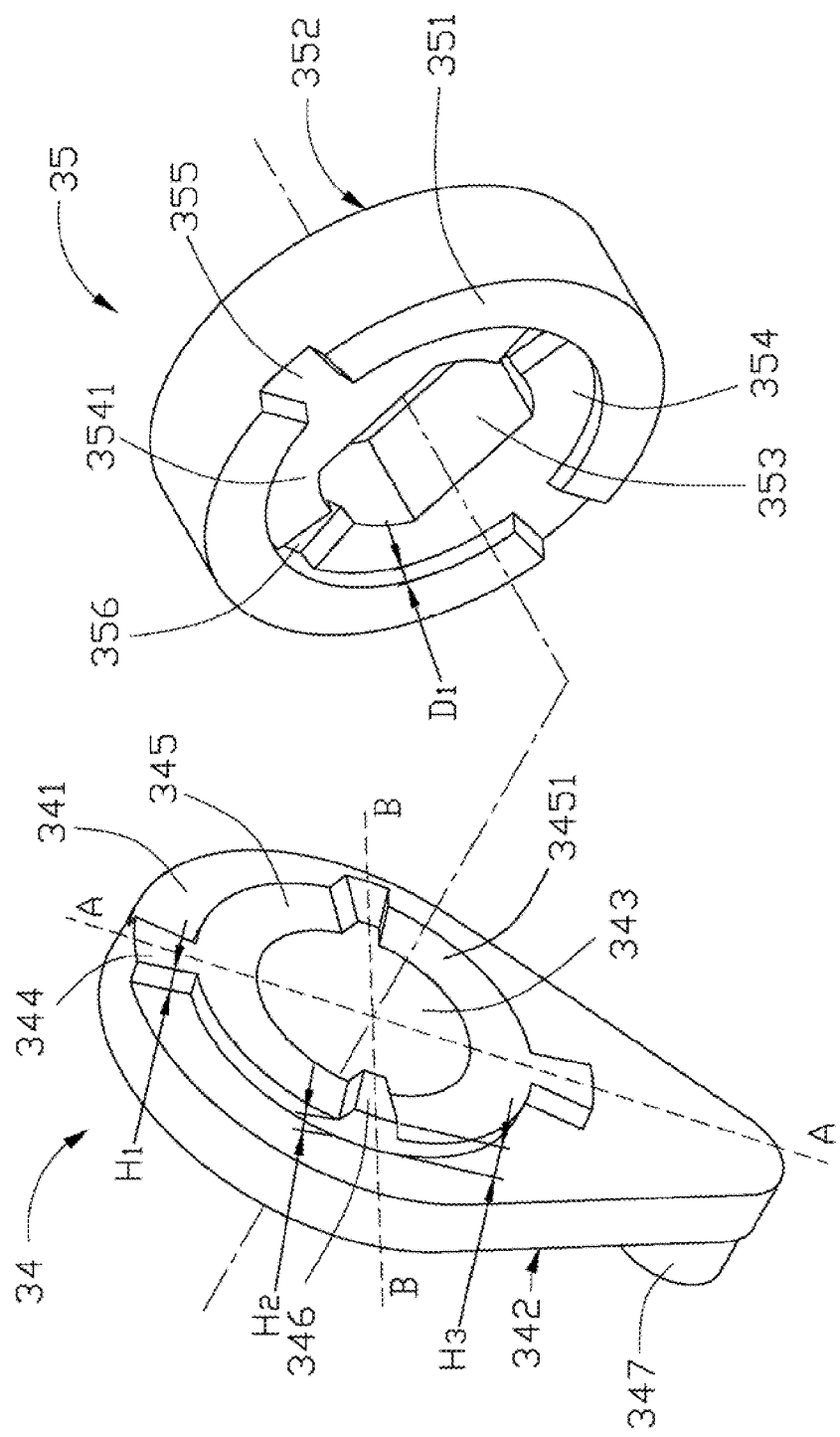
FIG. 2 is an isometric view of the stationary member and the rotating member of FIG. 1.

Referring to FIGS. 1 and 2, a hinge assembly 300 includes a pivotal shaft 31, a connecting member 32, a supporting member 33, a stationary member 34, a rotating member 35, an elastic member 36, a first frictional washer 371, a second frictional washer 372, a protecting washer 373, and a locking member 38.

The pivotal shaft 31 includes a flange 311, a shaft portion 312, and an inserting portion 313. The shaft portion 312 and the inserting portion 313 are on opposite sides of the flange 311. The shaft portion 312 forms a flat surface 3121 along a section of the shaft portion 312, thereby forming a deformed shaft portion. An end away from the flange 311 of the shaft portion 312 defines a plurality of screw threads 3123.

The connecting member 32 includes an assembling portion 321 and a connecting portion 322 substantially extending substantially perpendicularly from a side of the assembling portion 321. Both the assembling portion 321 and the connecting portion 322 may be substantially plate-shaped. The assembling portion 321 defines a plurality of through holes 3211. The connecting portion 322 defines a non-circular receiving hole 3221 to receive the inserting portion 313.

The supporting member 33 includes a fixing portion 331 and a supporting portion 332 extending substantially perpendicularly from a side of the fixing portion 331. Both the fixing portion 331 and the supporting portion 332 are substantially plate-shaped. The fixing portion 331 defines a plurality of through holes 3311. The supporting portion 332 defines a pivot hole 3321 and a latch hole 3322 adjacent to the pivot hole 3321. The pivotal shaft 31 may be inserted into the pivot hole 3321 such that the supporting member 33 is rotatably positioned on the pivotal shaft 31.

The stationary member 34 may be substantially plate-shaped. The stationary member 34 includes an engaging surface 341 and a fixing surface 342 opposite to the engaging surface 341. The stationary member 34 defines a pivot hole 343 communicating with the engaging surface 341 and the fixing surface 342. The stationary member 34 forms two first positioning protrusions 344 and a substantially circular stepped portion 345 on the engaging surface 341. The stepped portion 345 is adjacent to the pivot hole 343 and extends substantially perpendicularly from the engaging surface 341. The first positioning protrusions 344 are on a side away from the pivot hole 343 and substantially symmetrical relative to a center of the stepped portion 345. A height $H_1$ of the first positioning protrusions 344 may be substantially equal to a thickness $H_2$ of the stepped portion 345.

Furthermore, the stationary member 34 forms two second positioning protrusions 346 and a fixing protrusion 347. The second positioning protrusions 346 are on a top surface 3451 of the stepped portion 345 and the fixing protrusion 347 is formed on the fixing surface 342. The two second positioning protrusions 346 may be substantially symmetrical relative to a center of the stepped portion 345. The fixing protrusion 347 may be inserted into the latch hole 3322 of the supporting member 33.

In the illustrated embodiment, an imaginary line A-A connecting centers of the first positioning protrusions 344 may be substantially perpendicular to an imaginary line B-B connecting centers of the second positioning protrusions 346.

The rotating member 35 includes a receiving surface 351 and a resisting surface 352 opposite to the receiving surface 351. The rotating member 35 defines a deformed hole 353 extending through the receiving surface 351 and the resisting surface 352. A shape of the deformed hole 353 corresponds to that of the pivotal shaft 31 so that the pivotal shaft 31 may be non-rotatably received in the deformed hole 353.

Furthermore, the rotating member 35 defines a substantially circular depression 354 in the receiving surface 351. A shape of a depression 354 corresponds to that of the stepped portion 345 such that the stepped portion 345 may be received in the depression 354. A depth $D_1$ of the depression 354 may be larger than the thickness $H_2$ of the stepped portion 345, such that the depression 354 can also store lubricant oil. The rotating member 35 further defines two first positioning grooves 355 and two second positioning grooves 356. The first positioning grooves 355 and the second positioning grooves 356 are configured to receive the first positioning protrusions 344 and the second positioning protrusions 346, respectively The first positioning grooves 355 are adjacent to the depression 354, and the second positioning grooves 356 are in a bottom 3541 of the depression 354.

The first frictional washer 371 and the second frictional washer 372 have the same structure. The first frictional washer 371 defines a through hole 3711 and a plurality of oil holes 3712 adjacent to the through hole 3711. Lubricant oil can be applied in the oil holes 3712 to reduce frictional abrasions. The locking member 38 may be a screw nut that engages with the shaft portion 312 of the pivotal shaft 31.

Figure 3:
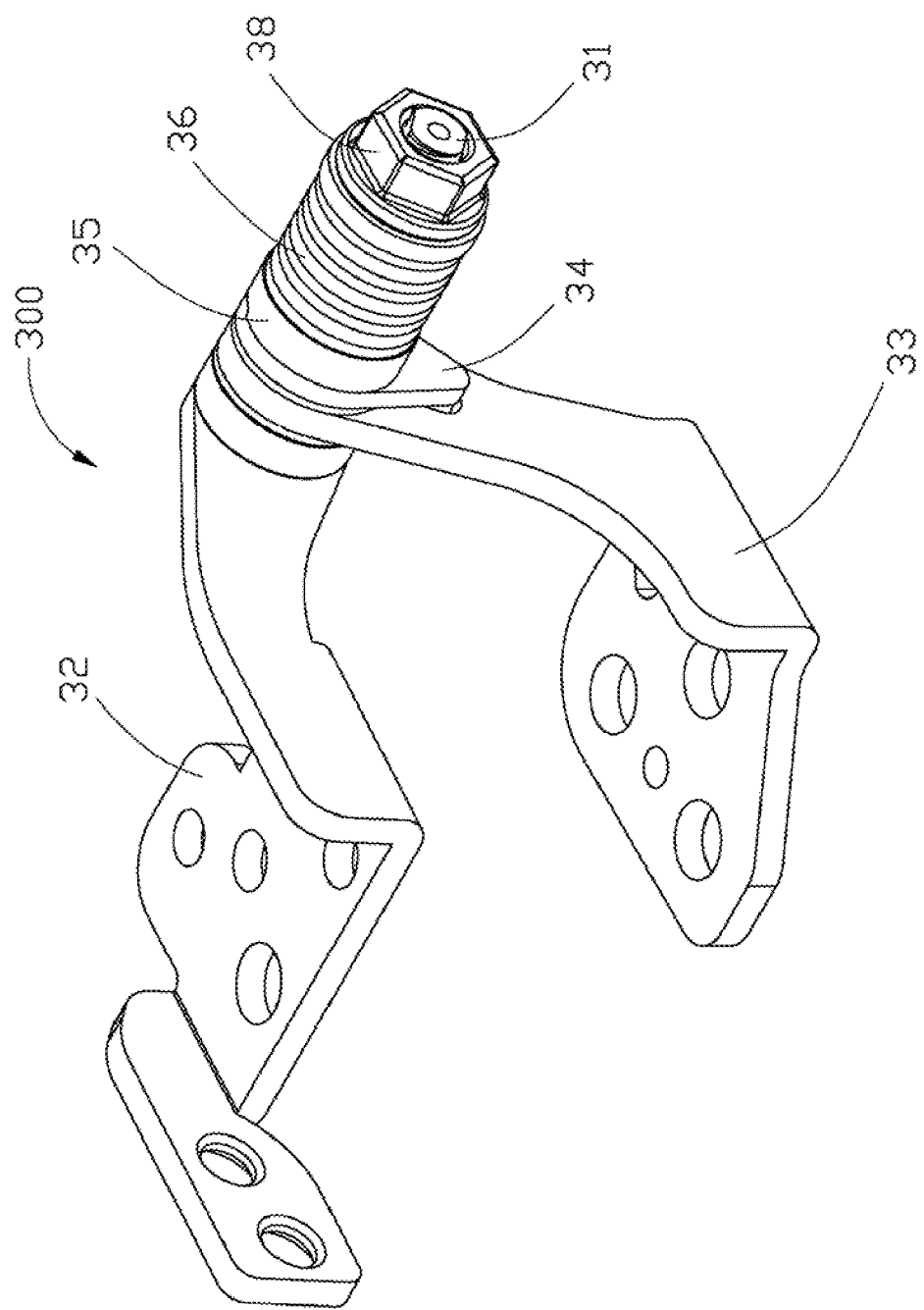
FIG. 3 is an assembled, isometric view of the hinge assembly of FIG. 1.

Also referring to FIG. 3, to assemble the hinge assembly 300, the second frictional washer 372 is positioned between the supporting portion 332 and the stationary member 34 such that the fixing protrusion 347 is received in the latch hole 3322.

The shaft portion 312 is passed through the first frictional washer 371, the receiving hole 3321, the second frictional washer 372, the pivot hole 343, the deformed hole 353, the elastic member 36, and the protecting washer 373 in that order, and the screw threads 3123 of the shaft portion 312 engage with the locking member 38. The elastic member 36 pushes the rotating member 35 and the protecting washer 373 such that the first positioning protrusions 344 and the second positioning protrusions 346 are received in the first positioning grooves 355 and the second positioning grooves 356, respectively. The first frictional washer 371 and the second frictional washer 372 resist the two corresponding side surfaces of the supporting portion 332. The protecting washer 373 protects the elastic member 36.

The inserting portion 313 is inserted into the receiving hole 3221 such that the pivotal shaft 31 is fixed to the connecting member 32. The connecting member 32, the rotating member 35, the fixing washer 373, and the locking member 38 are thus rotatable together with the pivotal shaft 31. The force of the elastic member 36 may be adjusted by rotating the locking member 38.

When an external force is applied on the connecting member 32, the connecting member 32 rotates and drives the pivotal shaft 31 to rotate, and the rotating member 35, the fixing washer 373, and the locking member 38 rotate together with the pivotal shaft 31.

Furthermore, after the connecting member 32 rotates a certain angle, the first positioning protrusions 344 and the second positioning protrusions 346 are received in the first positioning grooves 355 and the second positioning grooves 356, respectively. Therefore, the connecting member 32 can be stably held in a desired position relative to the supporting member 33.

When the hinge assembly 300 is employed in an electronic device, the connecting member 32 is fixed on a cover of the electronic device by the through hole 3211, and the supporting member 33 is fixed on a main body of the electronic device by the through holes 3311.

It should be pointed out that, symmetry of the positioning protrusions 344, 346 and the positioning grooves 355, 356 counter the latching forces of the stationary member 34 and the rotating member 35.

In the illustrated embodiment, the first positioning protrusions 344 have heights $H_1$ substantially equal to the thickness $H_2$ of the stepped portions 345, and the second positioning protrusions 346 are on the top surface of the stepped portion 345. In other words, the second positioning protrusions 346 have heights $H_3$ taller than the heights $H_1$ of the first positioning protrusions 344. Therefore, if the first positioning protrusions 344 are abraded and not functioning, the second positioning protrusions 346 continue to function, thus enhancing a service life of the hinge assembly 300. It may be understood that, if the heights $H_1$ and the heights $H_3$ are different, the stepped portion 3412 may be omitted.

It can be understood that, a number of the first positioning protrusions 344 and the second positioning protrusions 346 may be increased. In addition, the first positioning protrusions 344 and the second positioning protrusions 346 may be defined in the rotating member 35.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed:

1. A hinge assembly comprising:
   a pivotal shaft;
   a connecting member;
   a supporting member;
   a stationary member comprising an engaging surface;
   a rotating member comprising a receiving surface; and
   a locking member, wherein a first end of the pivotal shaft is fixed to the connecting member, and a second end of the pivotal shaft opposite to the first end is passed through the supporting member, the stationary member, the rotating member, and the locking member in that order; the stationary member is fixed on the supporting member and is rotatable relative to the pivotal shaft; the rotating member is non-rotatable relative to the pivotal shaft; the engaging surface forms a plurality of first positioning protrusions; the receiving surface defines a plurality of first positioning grooves to receive the first positioning protrusions; one of the engaging surface and the receiving surface forms a plurality of second positioning protrusions and the other one of the engaging surface and the receiving surface defines a plurality of second positioning grooves to receive the second positioning protrusions; a height of each second positioning protrusion is larger than a height of each first positioning protrusion.

2. The hinge assembly of claim 1, wherein the second positioning protrusions are formed on the engaging surface, and the second positioning grooves are defined in the receiving surface.

3. The hinge assembly of claim 2, wherein the stationary member defines a pivot hole; the stationary member forms a stepped portion on the engaging surface, the stepped portion is adjacent to the pivot hole and the first positioning protrusions are on a side away from the pivot hole; the second positioning protrusions are formed on a top surface of the stepped portion; the rotating member defines a depression to receive the stepped portion; the first positioning grooves are defined in a bottom of the depression, and the second positioning grooves are adjacent to the depression; the stepped portion is received in the depression.

4. The hinge assembly of claim 3, wherein a depth of the depression is larger than a thickness of the stepped portion.

5. The hinge assembly of claim 3, wherein both the stepped portion and the depression are substantially circular.

6. The hinge assembly of claim 5, wherein the two first positioning protrusions are substantially symmetrical relative to a center of the stepped portion, and the two second positioning protrusions are substantially symmetrical relative to the center of the stepped portion.

7. The hinge assembly of claim 1, further comprising an elastic member, wherein the elastic member pushes the rotating member.

8. The hinge assembly of claim 1, wherein the stationary member further comprises a fixing surface opposite to the engaging surface and a fixing protrusion formed on the fixing surface; the supporting member defines a latch hole; the fixing protrusion is received in the latch hole.

9. The hinge assembly of claim 1, further comprising a first frictional washer and a second frictional washer, wherein the first frictional washer and the second frictional washer are sleeved on the pivotal shaft, and resist the two side surfaces of the supporting member.

10. The hinge assembly of claim 9, wherein the first frictional washer and the second frictional washer defines a plurality of oil holes.

11. The hinge assembly of claim 8, wherein the supporting member comprises a fixing portion and a supporting portion extending substantially perpendicularly from a side of the fixing portion, both the fixing portion and the supporting portion are plate-shaped; the supporting portion defines a pivot hole to receive the pivotal shaft; the latch hole is adjacent to the pivot hole.

12. The hinge assembly of claim 11, wherein the fixing portion defines a plurality of through holes.

13. The hinge assembly of claim 1, wherein the pivotal shaft comprises a flange, a shaft portion, and a non-circular inserting portion; the shaft portion and the inserting portion are on opposite sides of the flange; the connecting member comprises an assembling portion and a connecting portion extending substantially perpendicularly from a side of the assembly portion; both the assembling portion and the connecting portion are plate-shaped; the connecting portion defines a non-circular receiving hole to receive the inserting portion; the inserting portion is inserted in the receiving hole such that pivotal shaft is fixed to the connecting member.

14. The hinge assembly of claim 13, wherein the assembling portion defines a plurality of through holes.

15. The hinge assembly of claim 13, wherein the shaft portion forms a flat surface along a section of the shaft portion, thereby forming a deformed shaft portion; the rotating member defines a deformed hole; the deformed shaft portion is received in the deformed hole such that the rotating member is non-rotatable relative to the pivotal shaft.

* * * * *